United States Patent [19]

Karp et al.

[11] 4,066,872
[45] Jan. 3, 1978

[54] INFORMATION RETRIEVAL SYSTEM WITH EXPANDED LOGIC CAPABILITY

[75] Inventors: Robert S. Karp, Evanston; John R. Flint, Barrington, both of Ill.

[73] Assignee: Bell & Howell Company, Chicago, Ill.

[21] Appl. No.: 711,175

[22] Filed: Aug. 3, 1976

[51] Int. Cl.² .................. G03B 23/12; G11B 15/18
[52] U.S. Cl. ............................. 353/26 A; 360/72
[58] Field of Search ............... 360/72; 235/61.7 R, 235/61.11 R; 353/25, 26 R

[56] References Cited

U.S. PATENT DOCUMENTS 3,941,978   3/1976   Husron et al. ............... 235/61.7 R Primary Examiner—Vincent P. Canney
Attorney, Agent, or Firm—Robert A. Walsh

[57] ABSTRACT

The disclosure relates to a system and method for expanding the capacity of the logic control for an information bearing element retrieval system. The system disclosed includes means for determining if the absolute numerical difference between a predetermined digit of a current number identifying the current information bearing element being inspected, and a target number identifying the information bearing element to be inspected, is equal to or greater than a preselected integer. If the absolute numerical difference is equal to or greater than the preselected integer, the normal direction of scanning the information bearing elements is reversed. In so doing, a logic control and display having a finite $n$ digit capacity may properly handle consecutively numbered information bearing elements having identification numbers of more than $n$ digits.

8 Claims, 3 Drawing Figures

INFORMATION RETRIEVAL SYSTEM WITH EXPANDED LOGIC CAPABILITY

BACKGROUND OF THE INVENTION

The present invention is generally directed to an information retrieval system of the type which automatically retrieves selected information bearing elements for inspection. The present invention is more particularly directed to an automatic film searching and retrieval system for use with film having a plurality of consecutively numbered frames, and wherein each frame includes an information image and an adjacent frame marker.

Information retrieval systems are well known. One efficient type of retrieval system that has found widespread acceptance is often referred to as a microfilm retrieval system. In such systems, copies of documents and/or data are recorded on film such as 16 mm film wherein each film frame comprises an information bearing element. With the size of the film frames being on the order of 1 mm per document inch, such size reduction affords a substantial reduction in information storage volume and greatly simplifies handling of the information. Such a reduction in size necessarily inhibits direct reading of the information bearing elements or film frames and the usual procedure for reading them is to project the film frame images onto a screen and to magnify them to a size corresponding approximately to the original size of the information document that is recorded.

Because literally thousands of information bearing elements or film frames comprise a roll of microfilm, searching for a particular image film frame can be time consuming. As an example, microfilm reels are known to include information bearing elements or frames on the order of 40,000 frames per reel. To provide ready access to a preselected information bearing element or film frame, automatic search techniques have been developed in the form of automatic retrieval systems.

In such systems, the film frames of the microfilm reels are numbered consecutively for identification and each film frame has an adjacent marker which may be sensed so that as the film frames are scanned they may be counted and the identification numbers displayed. Hence, at the end of a scan cycle the display provides the current number of the film frame being inspected.

Retrieval systems also include a means for entering a target number which identifies the film frame to be inspected. Suitable logic within the retrieval systems determines from the current number and the target number whether the film is to be driven in an up direction or a down direction to arrive at the preselected film frame to be inspected.

The logic control of film retrieval systems are of a finite capacity having a capacity for handling film frame identification numbers of only $n$ digits. Consequently, such retrieval systems include displays of $n$ digits, and counters, comparators, or the like having $n$ digit capacities. Thus, for microfilm reels having frames with identification numbers up to 99,999, a five digit retrieval system is appropriate. Unfortunately, however, a reel of microfilm may have as many as 40,000 consecutively numbered film frames, numbered from, for example, 80,000 to 120,000. The prior retrieval systems having a finite capacity of five digits cannot possibly handle such reels.

For example, given a microfilm reel having 40,000 frames numbered 80,000 to 120,000, and assuming it is required to search for a film frame numbered 110,000 from a currently inspected film frame numbered 90,000, when the target number of 110,000 is entered into the control logic and displayed, the target number will be shifted into the display and will appear as 10,000 (on a five digit retrieval system). When the logic then compares the current number of 90,000 to the target number of 10,000, it will determine that the film must be scanned in the downward direction to arrive at the preselected document. However, in actuality, the film must be scanned in the upward direction to go from the current film frame of 90,000 to the target film frame of 110,000.

From the foregoing, it can be seen that prior retrieval systems are only capable of handling information bearing elements which have identification numbers of a fixed predetermined number of digits or less. Where many information elements must be stored, duplication of identification numbers cannot be avoided. Obviously, such duplication can cause information storing problems.

It is, therefore, an object of the present invention to provide a new and improved information retrieval system.

It is a further object of the present invention to provide an information retrieval system having expanded logic control capabilities.

It is a still further object of the present invention to provide an information retrieval system of the type which automatically retrieves selected information bearing elements for inspection, which information bearing elements are numbered consecutively for identification, and wherein the information retrieval system is capable of handling information bearing elements having identification numbers of any number of digits.

It is a still more particular object of the present invention to provide an automatic film searching and retrieval system for use with film having a plurality of consecutively numbered frames and wherein the retrieval system is capable of handling reels of film having film frames with identification numbers of any number of digits.

It is a still further object of the present invention to provide a new and improved method of retrieving and scanning information bearing elements for inspection.

SUMMARY OF THE INVENTION

The invention provides an information retrieval system of the type which automatically retrieves selected information bearing elements for inspection which are numbered consecutively for identification, wherein each information bearing element includes a marker, and wherein the system includes a sensor for sensing the markers and scanning means for scanning the information bearing elements in first or second directions to arrive at a selected image bearing element from a currently inspected information bearing element. The system comprises an $n$ digit up/down counter coupled to the sensor for counting the information bearing elements as they are scanned to provide the identification number of the currently inspected information bearing element as a current number, an $n$ digit storage means for providing the identification number of a selected information bearing element as a target number, and an $n$ digit comparator coupled to the $n$ digit up/down counter and to the $n$ digit storage means for comparing the current number to the target number and for providing responsive to the comparison a first signal when the target number is greater than the current number and a second signal when the target number is less than the current number. The system also includes a scan direction control means coupled to the comparator and to the scanning means and responsive to the first and second signals for causing the scanning means to scan the information bearing elements in the first direction responsive to the first signal and in the second direction responsive to the second signal, and scan direction reversal control means coupled to the $n$ digit up/down counter, to the $n$ digit storage means, and to the scan direction control means, the scan direction reversal control means including means for determining if the absolute numerical difference between the $n$th digit of the current number and the $n$th digit of the target number is equal to or greater than a preselected integer and means for providing the scan direction control means with a scan direction reversal control signal when the absolute numerical difference is equal to or greater than the preselected integer for causing the scan direction control means to cause the scanning means to scan the information bearing elements in the second direction responsive to the combination of the first signal and the scan direction reversal control signal and to cause the scanning means to scan the information bearing elements in the first direction in response to the combination of the second signal and the scan direction reversal control signal.

The invention also provides a method of retrieving and scanning information bearing elements for inspection wherein the information bearing elements are numbered consecutively for identification, the method comprising providing a current number representing the identification number of the information bearing element currently being inspected, providing a target number representing the information bearing element to be inspected, comparing the current number to the target number to determine which is greater, comparing a predetermined digit of the current number and the target number and determining if the absolute numerical difference of the predetermined digits is equal to or greater than a preselected integer, scanning the information bearing elements in a first direction when the target number is greater than the current number and the absolute numerical difference of the predetermined digit is less than the preselected integer, and when the current number is greater than the target number and the absolute numerical difference of the predetermined digits is equal to or greater than the preselected integer, and scanning the information bearing elements in a second direction when the current number is greater than the target number and the absolute numerical difference of the predetermined digits is less than the preselected integer, and when the target number is greater than the current number and the absolute numerical difference of the predetermined digits is equal to or greater than the preselected integer.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, and in the several figures of which like reference numerals identify like elements, and in which:

DESCRIPTION OF THE PREFERRED EMBODIMENT

Figure 1:
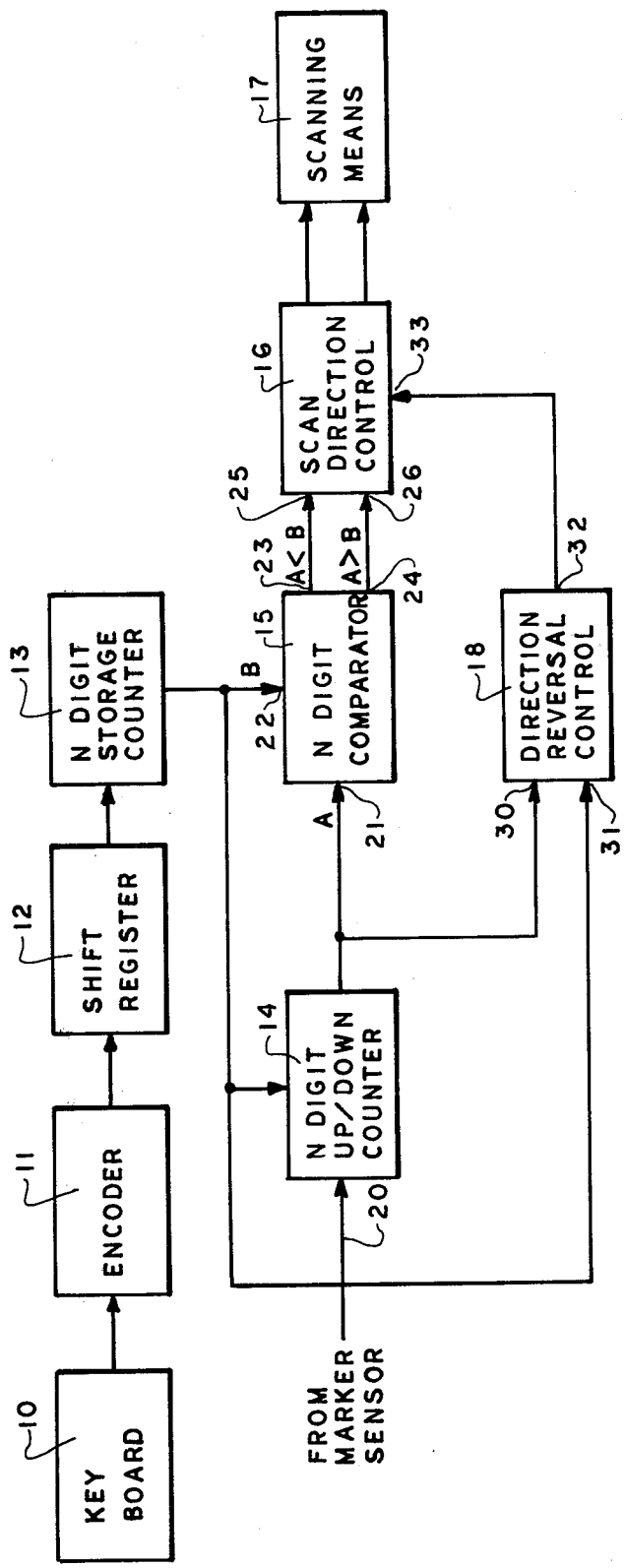
FIG. 1 is a block diagram of an information retrieval system embodying the present invention.

Referring now to FIG. 1, the information retrieval system there shown includes a keyboard 10, an encoder 11, a shift register 12, an $n$ digit storage counter 13, an $n$ digit up/down counter 14, an $n$ digit comparator 15, a scan direction control 16, a scanning means 17, and a direction reversal control 18. As described herein, the preferred embodiment will be related to a microfilm retrieval system wherein the image bearing elements are in the form of microfilm frames.

Keyboard 10 includes a plurality of keys which are pressed to indicate the number of the selected film frame to be inspected. Keyboard 10 is coupled to encoder 11 which transforms the decimal film frame identification number to be inspected into $n$ binary coded decimal digits. Encoder 11 is coupled to shift register 12 and shift register 12 is coupled to the $n$ digit storage counter 13. Shift register 12 shifts the $n$ binary coded decimal digits representing the identification number of the selected film frame to be inspected into the $n$ digit storage counter 13.

N digit up/down counter 14 has an input coupled to a film frame marker sensor by line 20. Each film frame may include an adjacent marker to thereby allow the film frames to be counted as they are scanned. The film frame markers and film frame marker sensor may be constructed in a manner fully taught in U.S. Pat. No. 3,941,978, which issued Mar. 2, 1976, in the names of James E. Huston and Robert W. Murre, which patent is assigned to the assignee of the present invention. As taught in that patent, each film frame includes a marker window which operates in association with a pair of light pipes. The light projected through the light pipes is detected by a pair of photo sensors which generate an output responsive to the light being sensed. As a result, a first wave form is provided when the film is scanned in a first direction and a second wave form is provided when the film is scanned in a second direction. As a result, the film frames are not only sensed for counting but additionally the direction in which the film is being scanned is discernible so that the $n$ digit up/down counter 14 may count down when the frames are moving in a down direction.

Preferably, each film frame is provided with an identification number. It may be desirable to start a microfilm reel at a film frame number other than 1. To this end, the $n$ digit up/down counter 14 is coupled to the $n$ digit storage counter 13 so that it receives the proper starting film frame identification number from which to count.

N digit comparator 15 has an input 21 coupled to the $n$ digit up/down counter 14 for receiving the film frame identification numbers as they are scanned. As a result, when the film is caused to stop, input 21 will receive the film frame identification number of the film frame currently being inspected. This number is indicated in FIG. 1 as being "A".

N digit comparator 15 has another input 22 which is coupled to the $n$ digit storage counter 13. It receives at input 22 the film frame identification number of the selected film frame to be inspected which number is identified by "B". The $n$ digit comparator 15 has a pair of outputs 23 and 24. It compares the current number "A" and the target number "B" and provides a signal at one of the outputs 23 and 24 in response to that comparison. If the target number "B" is greater than the current number "A", the $n$ digit comparator will provide a first signal at output 23. On the other hand, if the current number "A" is greater than the target number "B", comparator 15 will provide a second signal at output 24.

Comparator 15 is coupled to the scan direction control with output 23 being coupled to input 25 of the scan direction control 16 and output 24 being coupled to input 26 of the scan direction control 16. The scan direction control 16 in response to the first and second signals will cause the scanning means 17 to which it is coupled to scan the film frames in a first direction responsive to the first signal and in a second direction responsive to the second signal. Specifically, when the target number "B" is greater than the current number "A", the $n$ digit comparator 15 will provide the first signal at output 23 which will cause the scan direction control 16 to cause the scanning means 17 to scan the microfilm in the up direction. Conversely, when the current number "A" is greater than the target number "B", the $n$ digit comparator 15 will provide at output 24 the second signal which causes the scan direction control 16 to cause scanning means 17 to scan in the down direction.

As thus far described, the system of FIG. 1 operates in a similar manner to microfilm retrieval systems of the prior art such as the microfilm retrieval system fully described in the aforementioned Murre and Huston patent. However, the system as thus far described is only capable of retrieving documents which have identification numbers of $n$ digits. Should either the current number "A" or the target number "B" be of more than $n$ digits, the retrieval system thus far described will not properly operate. To overcome this, the retrieval system of FIG. 1 includes a direction reversal control 18.

The direction reversal control 18 has a first input 30 which is coupled to the $n$ digit up/down counter for receiving the $n$th digit of the current number "A", and a second input 31 coupled to the $n$ digit storage counter 13 for receiving the $n$th digit of the target number "B". Direction reversal control 18 determines if the absolute numerical difference between the $n$th digit of the current number "A" and the $n$th digit of the target number "B" is equal to or greater than a preselected integer. If the numerical difference between the $n$th digit of the current number and the $n$th digit of the target number is equal to or greater than the preselected integer, the direction reversal control 18 will provide at output 32 a direction reversal control signal which is impressed upon the scan direction control 16 at input 33.

The direction reversal control signal will cause the scan direction control 16 to cause the scanning means 17 to scan in a direction which is the reverse of the normal scanning direction. Should the absolute numerical difference between the $n$th digit of the current number and the $n$th digit of the target number be less than the preselected integer, the direction reversal control 18 will not provide the direction reversal control signal to the scan direction control 16, and the system will operate as normal.

Assume for the moment that the $n$ digit storage counter, the $n$ digit up/down counter, and the $n$ digit comparator all have five digit capacities. Also, assume that the preselected integer is 5 and that the film frame presently being inspected is numbered 90,000. Now assume that the operator wishes to select film frame 110,000 for inspection. When the operator presses the numerical keys on keyboard 10 to enter the target number of 110,000, the five digit storage counter 13 will contain five binary coded decimal digits representing the target number as 10,000. The reason for this is that when the least significant (6th) digit is shifted into the $n$ digit storage counter by shift register 12, the most significant digit is lost. As a result, the five digit storage counter presumably has a target number stored therein of 10,000 and the five digit up/down counter has a current number of 90,000. When comparator 15 compares the current number to the target number it will appear as though the current number is greater than the target number. Thus, the five digit comparator 15 will provide the second signal at output 24 in an endeavor to make the scan direction control cause the scanning means to scan in the down direction.

However, the direction reversal control has determined that the $n$th or fifth digit of the current number is 9 and the $n$th or fifth digit of the target number is 1. Thus, the absolute numerical difference between the fifth digit of the current number and the fifth digit of the target number is 8 and is thus greater than 5, the preselected integer. The direction reversal control 18 will thereupon provide at output 32 the direction reversal control signal to the scan direction control at input 33 to cause the scanning means to scan the documents in the up direction and not the down direction as would normally be indicated.

As can be seen from the foregoing, the scan direction reversal control 18 provides the scan direction control with a scan direction reversal control signal when the absolute numerical difference is equal to or greater than the preselected integer for causing the scan direction control to cause the scanning means to scan the film frames in the second direction responsive to the combination of the first signal and the scan direction reversal control signal and to cause the scanning means to scan the film frames in the first direction in response to the combination of the second signal and the scan direction reversal control signal. Also, as a result, the retrieval system of FIG. 1 is capable of handling film frame reels having film frames with identification numbers of more than five digits even though the logic controls have a capacity of five digits.

As a prerequisite, however, the film frames must be consecutively numbered and must be limited in number. For the example just described wherein the logic control had five digit capacity and the preselected integer was 5, the information retrieval system has a capacity to handle a reel of film having 40,000 film frames. This obtains because it has been developed that the capacity of the information retrieval system of FIG. 1 is equal to a reel of film having a number of consecutively numbered film frames as below:

$$C = (R-1) \times 10^{n-1}$$

wherein: $C$ is the film frame capacity in film frames,
$n$ is the digit capacity of the control logic, and R is the preselected integer from 2 to 5.

Figure 2:
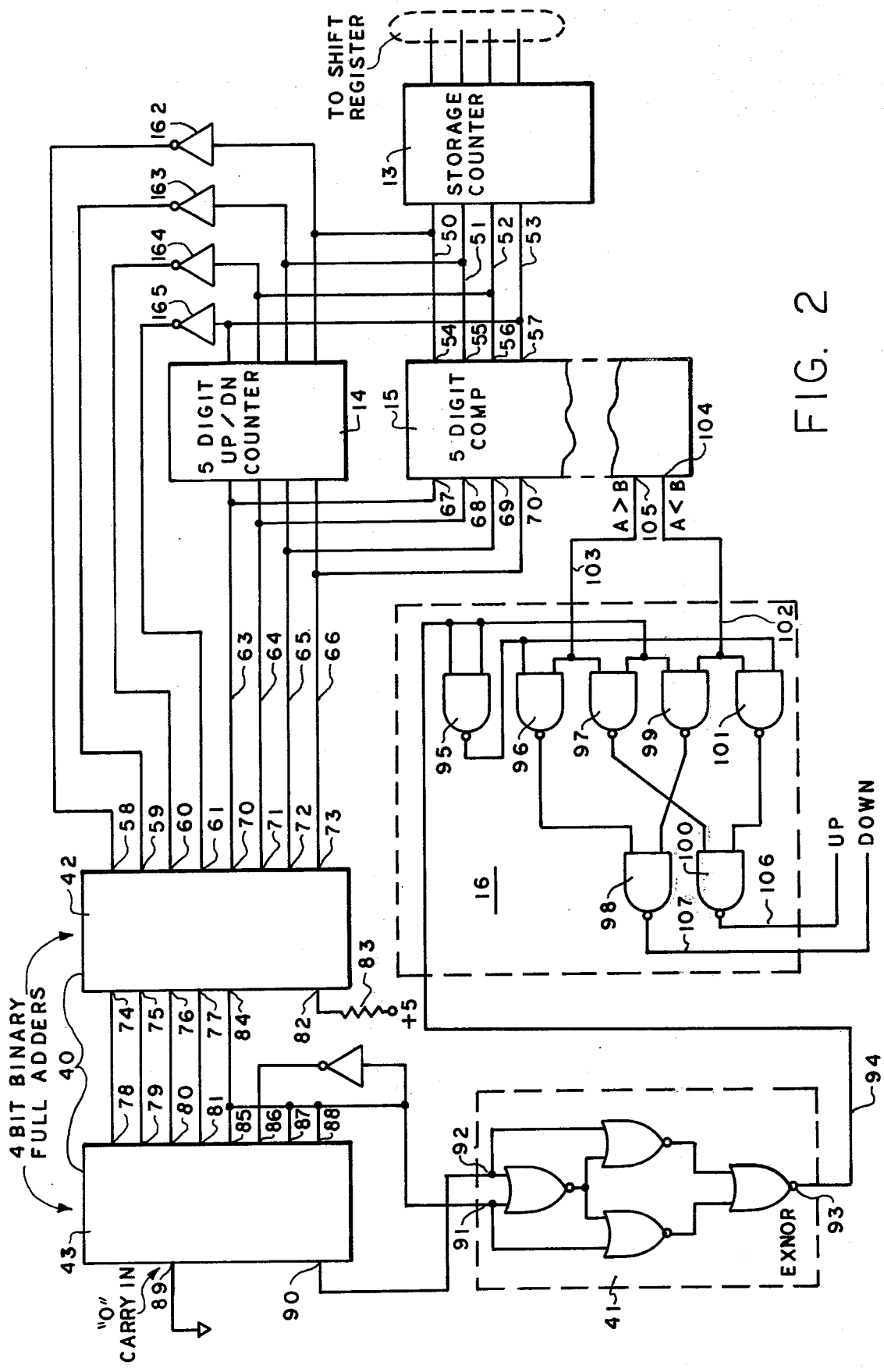
FIG. 2 is a schematic circuit diagram, partially in block form, showing one embodiment of the present invention.

The embodiment of FIG. 2 shows how the present invention may be practiced for retrieval systems having logic control of five digit capacity. The embodiment of FIG. 3, to be described hereinafter, shows how the retrieval system in accordance with the present invention may be practiced when having logic control of six digit capacity and a desired film frame capacity of 100,000 frames.

Referring now to FIG. 2, it shows the inputs and outputs specifically related to the fifth digit of the storage counter 13, the up/down counter 14, and the comparator 15, the scan direction control 16, and the direction reversal control 18 which comprises two 4 bit binary full adders 40 and an exclusive NOR circuit 41. By way of illustration only, the up/down counter 14 may comprise a series of 74C192 integrated circuits coupled together in a well known manner to form a five digit up/down counter of which the fifth digit is represented by the five digit up/down counter 14. The five digit comparator 15 may comprise a plurality of 74L85 integrated circuits coupled together in a well known manner to form a five digit comparator, the fifth digit of which is represented by the five digit comparator 15 of FIG. 2. Lastly, the 4 bit binary full adders may each include a 7483 integrated circuit. All of these circuits are commercially available and their operation is well known.

The 4 bit binary word representing the fifth digit of the target number is provided by storage counter 13 on lines 50, 51, 52, and 53. Lines 50–53 are coupled to the five digit comparator 15 at inputs 54, 55, 56, and 57 which comprise the "B" input to the comparator 15. Lines 50–53 are also coupled to the "B" inputs 58, 59, 60 and 61 of first adder circuit 42 by inverters 162, 163, 164, and 165, respectively. This provides inputs 58–61 with the 1's complement of the target fifth binary coded decimal digit.

The 4 bit binary representation of the fifth digit of the current number is provided by the five digit up/down counter 14 on lines 63, 64, 65, and 66. Lines 63–66 are coupled to the "A" inputs of the five digit comparator 15 at inputs 67, 68, 69, and 70, respectively. Lines 63–66 are also coupled to the "A" inputs of the first adder circuit 42 at inputs 70, 71, 72, and 73, respectively.

First adder circuit 42 has summation outputs 74, 75, 76, and 77 coupled to the "A" inputs 78, 79, 80, and 81, respectively, of the second adder circuit 43. The carry input 82 of first adder 42 is coupled to a positive 5 volts by resistor 83 to thereby set input 82 at a logical 1. Carry output 84 of first adder 42 is coupled to the input 85 of second adder 43. Because inputs 85, 87, and 88 are coupled together, the carry output 84 of the first adder will program a binary 0100 or 1's complement binary 1011 into the B inputs 85, 86, 87, and 88 of the second adder 43 if the carry output of the first adder 42 is 0 or 1 respectively. Carry input 89 of second adder 43 is appropriately grounded to set input 89 to a logical 0.

The carry output of the first and second adder circuits, outputs 84 and 90, respectively, are coupled to inputs 91 and 92, respectively, of the exclusive NOR circuit 41. When inputs 91 and 92 match, the exclusive NOR circuit will provide a logical 1 output and when the inputs do not match, the exclusive NOR circuit will provide a logical 0 at output 93.

Output 93 of exclusive NOR circuit 41 is connected to the scan direction control 16 by line 94. The scan direction control comprises NAND gates 95, 96, 97, 98, 99, 100, and 101 which are coupled together as shown. The scan direction control 16 has a pair of input forming lines 102 and 103 which are coupled to the outputs 104 and 105 of comparator 15, respectively. The scan direction control 16 also has a pair of output forming lines 106 and 107 which provide an up scan control signal and a down scan control signal, respectively.

When the target number "B" is greater than the current number "A", comparator 15 will provide a first signal at output 104 which will cause the scan direction control 16 to provide an up scan control signal at output line 106 to cause the scanning means which is coupled to output lines 106 and 107 to scan in the up direction. When the current number "A" is greater than the target number "B", comparator 15 will provide output 105 the second signal to cause the scan direction control to provide at output line 107 the down scan direction signal to cause the scanning means to scan in the downward direction. Of course, this assumes that the absolute numerical difference between the fifth digit of the current and target numbers is less than the preselected integer of 5.

However, when the absolute numerical difference of the fifth digit of the current number and target number is 5 or greater, the carry outputs 84 and 90 of the first and second adders 42 and 43 respectively will be of like state. As a result, exclusive NOR circuit 41 will provide at output 93 the logical 1. When the exclusive NOR circuit 41 provides the logical 1 state to the scan direction control 16, output 104 of comparator 15 is effectively coupled to the output line 107 of the scan direction control 16 and output 105 is effectively coupled to output line 106. As a result, a direction reversal will take place. That is to say, should the current number "A" be greater than the target number "B", which would normally call for the scanning means to scan in the downward direction, and should be absolute numerical difference between the fifth digits of the current and target numbers be equal to or greater than 5, output 105 will be effectively coupled to output line 106 to cause the scan direction control to provide the up scan direction signal instead. Conversely, when the target number "B" is greater than the current number "A", and when the absolute numerical difference between the fifth digits of the current and target numbers is equal to or greater than 5, output 104 is effectively coupled to output line 107 to cause the scanning means to scan in a downward direction.

To show more specifically how the system of FIG. 2 operates, two examples follow showing how the binary words are manipulated in order to determine whether the absolute numerical difference between the current and target numbers is equal to or greater than 5 to effect a direction reversal. The first example does not require a direction reversal but the second example does.

EXAMPLE 1

| | |
|---|---|
| Current "A" number = | 70,000 |
| Target "B" Number = | 90,000 |
| A: 5th Digit = 7 = | binary 0110 |
| "B" 5th Digit = 9 = | binary 1001 |
| | ↓ invert |
| First Adder Inputs A B | 0111 0110 ← |
| Partial Sum | 1101 |
| Add 1 | 0001 |

EXAMPLE 1-continued

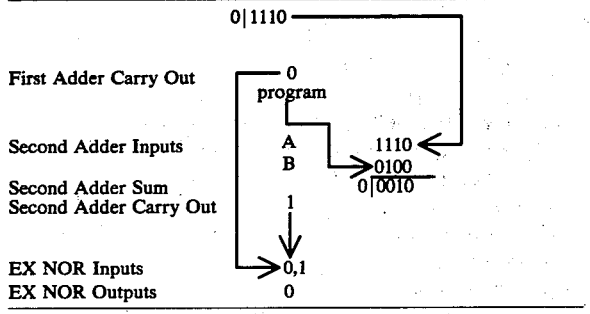

No reversal in scanning direction is required. The scan direction control will provide the up scan control signal at output 106 responsive to the first signal at output 104 of comparator 15.

EXAMPLE 2

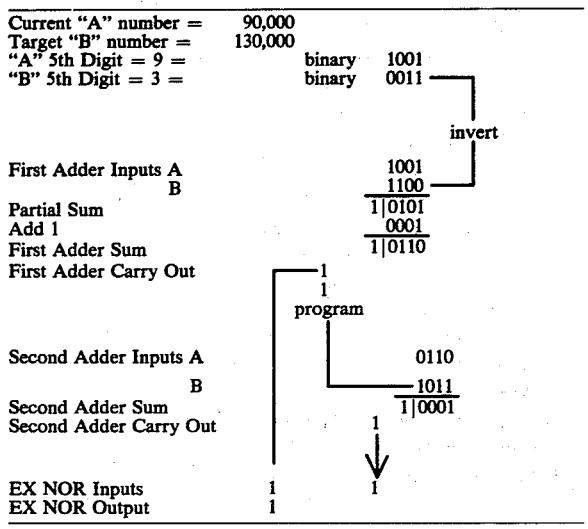

Reversal in scanning direction is required. The scan direction control 16 will provide the up scan control signal at output 106 responsive to the second signal at output 105 of comparator 15 and the logical "1" direction reversal control signal of the direction reversal control exclusive NOR circuit 41.

As previously mentioned, the system of FIG. 2 is capable of retrieving image film frames on a reel of microfilm which contains 40,000 consecutively numbered film frames. Where a reel of film contains 100,000 consecutively numbered film frames, the system of FIG. 3 may be used.

Figure 3:
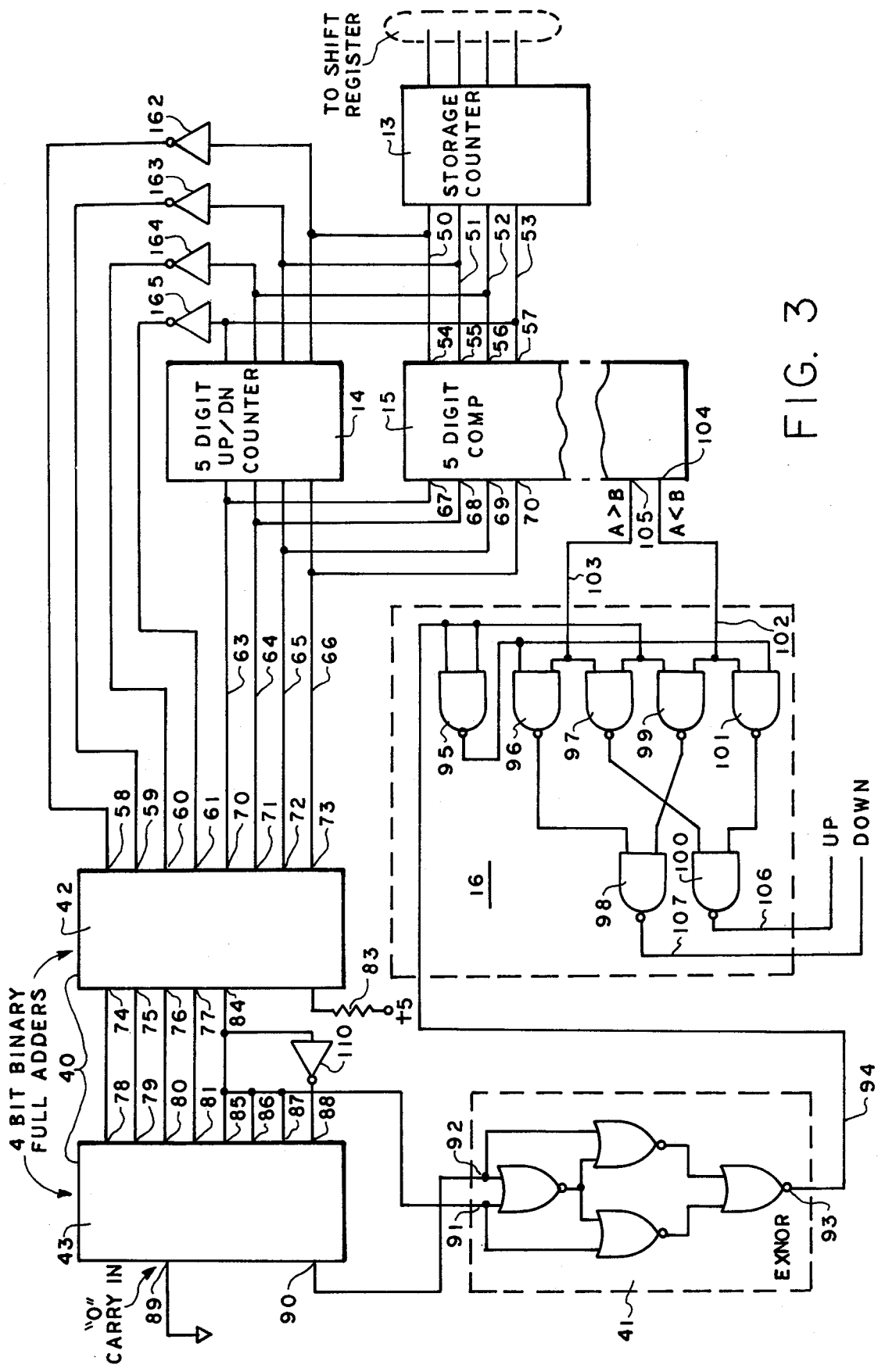
FIG. 3 is a schematic circuit diagram, partly in block form, showing another embodiment of the present invention.

The system of FIG. 3 is substantially identical to the system of FIG. 2 except that the sixth digits of the current and target numbers are compared and the determination as to whether the absolute numerical difference between the sixth digits of the target and current numbers is equal to or greater than 2. Recalling for a moment that the capacity C is determined by the equation $C = (R-1) \times 10^{n-1}$, and assuming that R is equal to 2 and N is equal to 6, the capacity of FIG. 3 is then $C = (2-1) \times 10^{6-1}$ which is equal to 100,000.

As a result of the above, the up/down counter, the comparator, the storage counter, all have six digit capacity. The only other difference is in the B inputs of second adder 43. Specifically, B inputs 85, 86, and 87 are coupled together and carry output 84 of first adder 42 is coupled to B input 88 by inverter 110. As a result, the carry output 84 of first adder 42 is used to program a binary 0001 or its 1's complement 1110 into the B input of the second adder at input 85-89 if the carry output of the first adder is 0 or 1 respectively.

In all other respects, the operation of the system of FIG. 3 is identical to the operation of the system of FIG. 2 and therefore will not be described in detail herein. Suffice it to say that should the current number "A" be greater than the target number "B", and should the absolute numerical difference between the sixth digits of the current and target numbers be less than 2, the scan direction control 16 will provide at output line 107 the down scan direction control signal to cause the scanning means to scan in the downward direction. However, should the absolute numerical difference between the current number and the target number be equal to or greater than 2, the scan direction control 16 will provide the up scan direction control signal at line 106.

In the case where the target number "B" is greater than the current number "A" and where the absolute numerical difference between the sixth digit of the target and current number is less than 2, the scan direction control 16 will provide the up scan direction control signal at line 106. However, should the absolute numerical difference between the sixth digits of the target number and the current number be equal to or greater than 2, the scan direction control 16 will provide a down scan direction control signal at line 107.

In the embodiment of FIG. 3, two examples are shown, the first wherein no scan direction reversal is required and in the second where the scan direction reversal is required. The following examples are identified as examples 3 and 4.

EXAMPLE 3

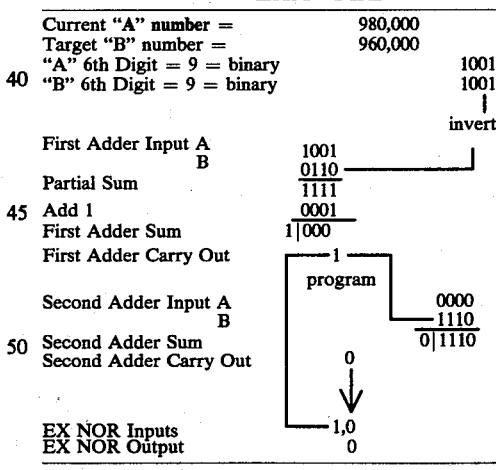

No reversal in scanning direction is required. The scan direction control will provide the down scan control signal at output 107 responsive to the second signal at output 105 of comparator 15.

EXAMPLE 4

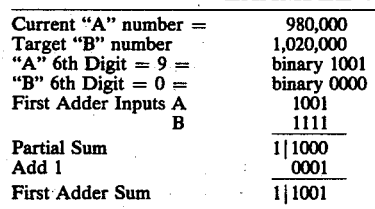

EXAMPLE 4-continued

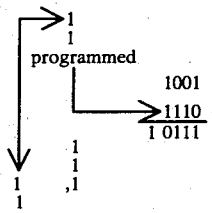

```
First Adder Carry Out           1
                                1
                        programmed
Second Adder Inputs A           1001
                    B
Second Adder Sum                1110
Second Adder Carry Out          1 0111
                        1
                        1
EX NOR Inputs        1   ,1
EX NOR Output        1
```

Reversal in scanning direction is required. The scan direction control will provide the up scan control signal at output 106 responsive to the second signal at output 105 to comparator and the logical "1" direction reversal control signal of the direction reversal control exclusive NOR circuit 41.

While particular embodiments of the invention have been shown and described, modifications may be made, and it is intended in the appended claims to cover all such modifications which fall within the true spirit and scope of the invention.

What is claimed is:

1. In an information retrieval system of the type having a scanning system for scanning information bearing elements in first and second directions to arrive at a selected information bearing element to be inspected from a currently inspected information bearing element, and wherein the scanning means is controlled by logic means having a finite $n$ digit capacity which acts upon a target number representing a selected information bearing element and a current number representing a currently inspected information bearing element for providing normal direction scanning control for target and current numbers of $n$ digits or less, a means for expanding the capacity of the logic means to provide proper direction scanning control for target or current numbers having more than $n$ digits comprising:

difference means for determining the absolute numerical difference between the $n$th digit of said target number and $n$th digit of said current number; and direction reversal control means coupled to said difference means and to the logic means for reversing the normal scanning means information bearing element scanning direction when said absolute numerical difference is equal to or greater than a preselected integer.

2. An information retrieval system of the type which automatically retrieves selected information bearing elements for inspection which are numbered consecutively for identification, wherein each information bearing element includes a marker, and wherein the system includes a sensor for sensing the markers and scanning means for scanning the information bearing elements in first or second directions to arrive at a selected information bearing element from a currently inspected information bearing element, said system comprising:

an $n$ digit up/down counter coupled to said sensor for counting the information bearing elements as they are scanned to provide the identification number of a currently inspected information bearing element as a current number;

a $n$ digit storage means for providing the identification number of a selected information bearing element as a target number;

an $n$ digit comparator coupled to said $n$ digit up/down counter and to said $n$ digit storage means for comparing said current number to said target number and for providing responsive to said comparison a first signal when said target number is greater than said current number and a second signal when said target number is less than said current number;

scan direction control means coupled to said comparator and to the scanning means and responsive to said first and second signals for causing said scanning means to scan the information bearing elements in the first direction responsive to said first signal and in the second direction responsive to said second signal; and scan direction reversal control means coupled to said $n$ digit up/down counter, to said $n$ digit storage counter, and to said scan direction control means, said scan direction reversal control means including means for determining if the absolute numerical difference between the $n$th digit of said current number and the $n$th digit of said target number is equal to or greater than a preselected integer and means for providing said scan direction control means with a scan direction reversal control signal when said absolute numerical difference is equal to or greater than a preselected integer for causing said scan direction control means to cause said scanning means to scan said information bearing elements in the second direction responsive to the combination of said first signal and said scan direction reversal control signal and to cause said scanning means to scan said information bearing elements in the first direction in response to the combination of said second signal and said scan direction reversal control signal.

3. A system in accordance with claim 2 wherein the system has the capacity for acting upon information bearing elements comprising 40,000 consecutively numbered information elements, wherein said $n$ digit up/down counter comprises a five digit up/down counter, wherein said $n$ digit storage means comprises a five digit storage means, wherein said $n$ digit comparator comprises a five digit comparator, and wherein said preselected integer is 5.

4. A system in accordance with claim 2 wherein the system has the capacity for acting upon information bearing elements comprising 100,000 consecutively numbered information elements, wherein said $n$ digit up/down counter comprises a six digit up/down counter, wherein said $n$ digit storage means comprises a six digit storage counter, wherein said $n$ digit comparator comprises a six digit comparator, and wherein said preselected integer is 2.

5. A automatic film searching and retrieval system for use with film having a plurality of consecutively numbered frames, each frame including information images and having an adjacent frame marker, and wherein the system includes a detector for detecting the frame markers and film drive means for driving the film in first or second directions to arrive at a selected film frame to be inspected from a currently inspected film frame, said system comprising:

an $n$ digit up/down counter coupled to said detector for counting the film frames as they are driven to provide the film frame number of a currently inspected film frame as a current number;

an $n$ digit storage means for providing the number of a selected film frame to be inspected as a target number;

an $n$ digit comparator coupled to said $n$ digit up/down counter and to said $n$ digit storage means for comparing said current number to said target number and for providing responsive to said comparison a first signal when said target number is greater than said current number and a second signal when said target number is less than said current number;

drive direction control means coupled to said comparator and to the film drive means and responsive to said first and second signals for causing said film drive means to drive said information bearing elements in the first direction responsive to said first signal and in the second direction responsive to said second signal and film drive direction reversal control means coupled to said $n$ digit up/down counter, to said $n$ digit storage means, and to said drive direction control means, said film drive direction reversal control means including means for determining if the absolute numerical difference between the $n$th digit of said current number and the $n$th digit of said target number is equal to or greater than a preselected integer and means for providing said drive direction control means with a film drive direction reversal control signal when said absolute numerical difference is equal to or greater than said preselected integer for causing said drive direction control means to cause said film drive means to drive the film in the second direction responsive to the combination of said first signal and said film drive direction reversal control signal and to cause said film drive means to drive the film in the first direction in response to the combination of said second signal and said film drive direction reversal control signal.

6. A system in accordance with claim 5 wherein the system has the capacity for acting upon film frames comprising 40,000 consecutively numbered film frames, wherein said $n$ digit up/down counter comprises a five digit up/down counter, wherein said $n$ digit storage means comprises a five digit storage means, wherein said $n$ digit comparator comprises a five digit comparator, and wherein said preselected integer is 5.

7. A system in accordance with claim 5 wherein the system has the capacity for acting upon film frames comprising 100,000 consecutively numbered film frames, wherein said $n$ digit up/down counter comprises a six digit up/down counter, wherein said $n$ digit storage means comprises a six digit storage means, wherein said $n$ digit comparator comprises a six digit comparator, and wherein said preselected integer is 2.

8. A method of retrieving and scanning information bearing elements for inspection wherein the information bearing elements are numbered consecutively for identification, said method comprising:

providing a current number representing the identification number of the information bearing element currently being inspected;

providing a target number representing the information bearing element to be inspected, comparing said current number to said target number to determine which is greater;

comparing a predetermined digit of said current number and target number and determining if the absolute numerical difference of said predetermined digits is equal to or greater than a preselected integer;

scanning the information bearing elements in a first direction when said target number is greater than said current number and the absolute numerical difference of said predetermined digits is less than said preselected integer, and when said current number is greater than said target number and the absolute numerical difference of said predetermined digits is equal to or greater than said preselected integer; and scanning the information bearing elements in a second direction when said current number is greater than said target number and the absolute numerical difference of said predetermined digit is less than said preselected integer, and when said target number is greater than said current number and the absolute numerical difference of said predetermined digits is equal to or greater than said preselected integer.

* * * * *